US012667850B2

(12) United States Patent
Wang

(10) Patent No.: US 12,667,850 B2
(45) Date of Patent: Jun. 30, 2026

(54) SPRINKLER AND INTELLIGENT TOILET

(71) Applicant: ZHEJIANG IKAHE SANITARY WARE CO., LTD., Taizhou (CN)

(72) Inventor: Shixiong Wang, Taizhou (CN)

(73) Assignee: ZHEJIANG IKAHE SANITARY WARE CO., LTD., Taizhou (CN)

( * ) Notice: Subject to any disclaimer, the term of this patent is extended or adjusted under 35 U.S.C. 154(b) by 239 days.

(21) Appl. No.: 18/608,844

(22) Filed: Mar. 18, 2024

(65) Prior Publication Data

US 2024/0326069 A1 Oct. 3, 2024

(30) Foreign Application Priority Data

Mar. 28, 2023 (CN) ......................... 202310320691.2

(51) Int. Cl.
*B05B 1/12* (2006.01)
*B05B 1/34* (2006.01)
*E03D 9/08* (2006.01)

(52) U.S. Cl.
CPC .............. *B05B 1/12* (2013.01); *B05B 1/3426* (2013.01); *B05B 1/3468* (2013.01); *E03D 9/08* (2013.01)

(58) Field of Classification Search
CPC ....... B05B 1/02; B05B 1/3026; B05B 1/3426; B05B 1/12; E03D 3/08
See application file for complete search history.

(56) References Cited

U.S. PATENT DOCUMENTS

2009/0057590 A1* 3/2009 Kok-Hiong ............... F16K 3/08 251/208
2015/0336116 A1* 11/2015 Gerdes ...................... B05B 1/12 239/443

FOREIGN PATENT DOCUMENTS

| | | | |
|---|---|---|---|
| CN | 113653143 | A | 11/2021 |
| CN | 217974646 | U | 12/2022 |
| JP | H1136410 | A | 2/1999 |
| JP | 2006152734 | A | 6/2006 |

OTHER PUBLICATIONS

First Office Opinion Notice issued in corresponding Chinese Application No. 202310320691.2, mailed May 29, 2025, 22 pages.

* cited by examiner

*Primary Examiner* — Tuongminh N Pham
(74) *Attorney, Agent, or Firm* — BAYES PLLC

(57) ABSTRACT

The embodiments of this application relate to an intelligent sanitary product field, in particular to a sprinkler and an intelligent toilet. The sprinkler includes a sprinkling mechanism, an adjusting mechanism and a water supply mechanism. The sprinkling mechanism is set with a mixing chamber, a first water distribution chamber and a second water distribution chamber. The adjusting mechanism includes a water outlet seat and an adjusting cap where the adjusting cap with a water hole can be placed on the water outlet seat in a movable way and the water outlet seat is set with a first water outlet trough and a second water outlet trough for connecting to the first water distribution chamber and the second water distribution chamber respectively. The water supply mechanism is set on the adjustment cap on the side away from the water outlet seat.

10 Claims, 11 Drawing Sheets

SPRINKLER AND INTELLIGENT TOILET

CROSS-REFERENCE TO RELATED APPLICATION

The present application claims the benefit of priority to Chinese Patent Application No. 202310320691.2, filed on Mar. 28, 2023, which is hereby incorporated by reference in its entirety.

TECHNICAL FIELD

The embodiments of this application relate to an intelligent sanitary product field, and more particularly, to a sprinkler and an intelligent toilet.

TECHNICAL BACKGROUND

Compared with traditional toilets, intelligent toilets are designed with functions that are more user-friendly, such as self-cleaning, massage, heating, warm air drying and sterilization. The cleaning function is one of the core functions of the intelligent toilets, and to pursue users' better experience, the cleaning function of the intelligent toilets has also developed accordingly. For example, for cleaning the human body, the intelligent toilet manufacturers have developed different cleaning water patterns to meet different needs based on a user's gender, age, and use demand.

However, the related arts commonly set different shaped water outlets on the washer to realize the different cleaning water patterns. The water can be shaped into different water patterns when flowing through water outlets with different shapes. However, limited by the number of water outlets, the structure only can realize the water patterns corresponding to the number of water outlets. In addition, when switching the water pattern, because the corresponding water outlet needs to be replaced, the water way shall be switched by the distribution valve in a washer, causing a relatively long time gap, thereby resulting in poor user experiences.

SUMMARY

The embodiments of this application provide a sprinkler which can improve the current situation where the structure of the water outlet causes a relatively long time gap when switching the water pattern, resulting in a poor user experience.

A technical scheme of the application for solving the above technical problem is to provide a sprinkler which includes a sprinkling mechanism, an adjusting mechanism, and a water supply mechanism. The sprinkling mechanism includes a mixing chamber, a first water distribution chamber and a second water distribution chamber where the first water distribution chamber and the second water distribution chamber are connected to the mixing chamber for sprinkling the vortex water and the straight water respectively from the mixing chamber. The adjusting mechanism includes a water outlet seat and an adjusting cap where the adjusting cap with a water hole can be placed on the water outlet seat in a movable way and the water outlet seat is set with a first water outlet trough and a second water outlet trough for connecting to the first water distribution chamber and the second water distribution chamber respectively. The water supply mechanism is set on the adjustment cap on the side away from the water outlet seat. The adjusting cap and the water outlet seat are in relative motion among the first preset position, the second preset position and the third preset position. At the first preset position, the water supply mechanism is connected to the first water outlet trough; at the second preset position, both the part of the first water outlet trough and the part of the second water outlet trough are connected to the water supply mechanism; at the third preset position, the water supply mechanism is connected to the second water outlet trough.

In some embodiments, along the first direction, the area of the first water outlet trough is M1, and the area of the first water outlet trough along the second direction gradually reduces. The area of the second water outlet trough is M2, and the area of the second water outlet trough along the second direction gradually increases. The area of the water hole is M3. M3 is greater than or equal to M1+M2. The first direction is perpendicular to the second direction.

In some embodiments, the water outlet seat is cylindrical, and both the first water outlet trough and the second water outlet trough are set surrounding the center of a circle of the water outlet seat. The water outlet seat includes a first water outlet which is set at the bottom of the first water outlet trough and is connected to the first water distribution chamber and a second water outlet which is set at the bottom of the second water outlet trough and is connected to the second water distribution chamber.

In some embodiments, along the second direction, the first water outlet trough gradually reduces in depth and the first water outlet is set at the bottom of the first water outlet trough with the maximum depth; and the second water outlet trough gradually increases in depth and the second water outlet is set at the bottom of the second water outlet trough with the maximum depth.

In some embodiments, along the first direction, the adjusting cap is pie-shaped, the water hole extends radially along the adjusting cap, and the width of an end of the water hole far away from the center of a circle of the adjusting cap is larger than or equal to the width of an end of the water hole close to the center of a circle of the adjusting cap.

In some embodiments, a body of the mixing chamber is cylindrical; the first water distribution chamber is connected to the mixing chamber, with the first water distribution port at the connection; the second water distribution chamber is connected to the mixing chamber, with the second water distribution port at the connection; and at least one of the first or the second water distribution port extends tangentially to the body of the mixing chamber, and the directions of the first and the second water distribution port are not collinear.

In some embodiments, the first water distribution port is connected to the mixing chamber and the first water distribution chamber along the tangent of the mixing chamber; and the second water distribution chamber is set with two second water distribution ports which are connected to the mixing chamber and the second water distribution port along the tangent direction of relative two ends of the radial direction of the mixing chamber.

In some embodiments, the diameter of the first water distribution port is smaller than that of the first water distribution chamber; and the diameter of the second water distribution port is smaller than that of the second water distribution chamber.

In some embodiments, the mixing chamber is set with a third water outlet with the diameter smaller than that of the mixing chamber and a fourth water outlet with the diameter larger than that of the third water outlet.

The other technical scheme of the application for solving the above technical problem is to provide an intelligent toilet including the sprinkler above.

The beneficial effect of the embodiments of this application is that, different from related arts, the embodiments of this application provide a sprinkler which includes a sprinkling mechanism, an adjusting mechanism and a water supply mechanism. The sprinkling mechanism includes a mixing chamber, a first water distribution chamber and a second water distribution chamber where the first water distribution chamber and the second water distribution chamber are connected to the mixing chamber for sprinkling the vortex water and the straight water respectively from the mixing chamber. The adjusting mechanism includes a water outlet seat and an adjusting cap where the adjusting cap with a water hole can be placed on the water outlet seat in a movable way and the water outlet seat is set with a first water outlet trough and a second water outlet trough for connecting to the first water distribution chamber and the second water distribution chamber respectively. The water supply mechanism is set on the adjustment cap on the side away from the water outlet seat. The adjusting cap and the water outlet seat are in relative motion among the first preset position, the second preset position and the third preset position. At the first preset position, the water supply mechanism is connected to the first water outlet trough; at the second preset position, both the part of the first water outlet trough and the part of the second water outlet trough are connected to the water supply mechanism; at the third preset position, the water supply mechanism is connected to the second water outlet trough. Above structure keeps connection between the first water outlet trough and the first water distribution chamber, and/or, between the second water outlet trough and the second water distribution chamber in relative motion among the first preset position, the second preset position and the third preset position so as to realize the stepless regulation between vortex flow and straight flow from the mixing chamber without the need of circuit break and water sprinkling again, providing convenience.

BRIEF DESCRIPTION OF DRAWINGS

By combining the accompanying drawings, a more detailed description of exemplary embodiments of the present application will be given, and the above and other objects, features, and advantages of the present application will become more apparent. In the exemplary embodiments of the present application, the same reference numerals generally denote the same parts.

DESCRIPTION OF REFERENCE NUMERALS

100—Sprinkler; 10—Sprinkling mechanism; 11—Mixing chamber; 12—The first water distribution chamber; 121—The first water distribution port; 13—The second water distribution chamber; 131—The second water distribution port; 14—The third water outlet; 15—The fourth water outlet; 16—Water distribution part; 20—Adjusting mechanism; 21—Water outlet seat; 211—The first water outlet trough; 212—The second water outlet trough; 213—The first water outlet; 214—The second water outlet; 22—Adjusting cap; 221—Water hole; 30—Water supply mechanism; X—The first direction; Y—The second direction.

DETAILED DESCRIPTION

To make objectives, technical solutions, and advantages of the present disclosure clearer, embodiments of the present disclosure are described in further detail below with reference to the drawings.

For better knowledge of the application, the following drawings and specific embodiments show a more detailed description for the application. It should be noted that when a component is expressed as "fixed on" another component, it may be directly fixed on another component, or there may be one or more medium components. When a component is expressed as "connected to" another component, it may be directly connected to another component, or there may be one or more medium components. When a component is expressed as "connected to" or "connected with" another component, it may be directly connected to another component, or there may be one or more medium components. The terms "perpendicular," "horizontal," "left," "right," and other similar expressions are used to denote relative spatial relationships between different components or objects in the specification and are not intended to limit their respective positions.

Unless otherwise defined, all technical and scientific terms in the specifications show the same meanings as those commonly understood by the persons skilled in the art of this application. The terms in the specifications in the application are only for describing the purpose of specific embodiments and are not intended to limit the application. The term "and/or" in the specifications include any and all combinations of one or more related listed items.

Figure 1:
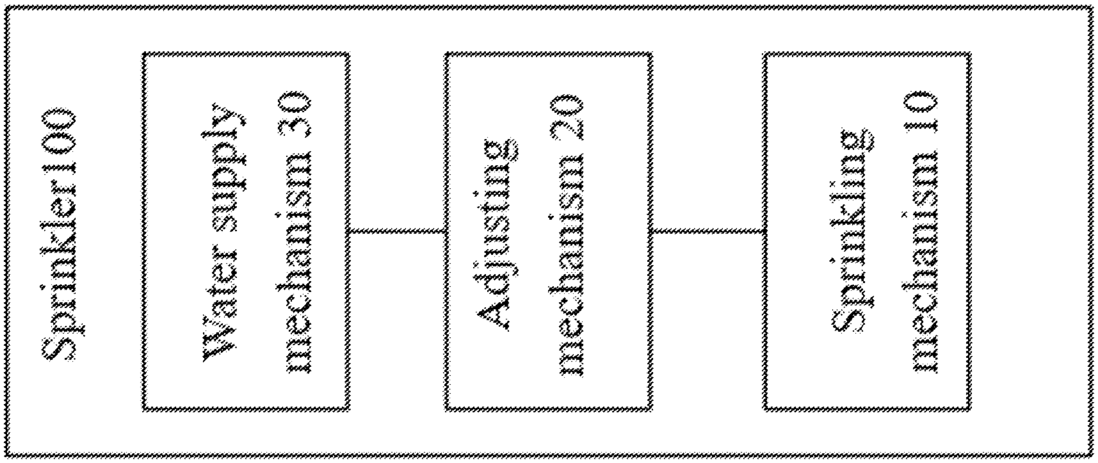
FIG. 1 illustrates a schematic diagram of water way connection of the sprinkler, according to an embodiment of this application.

FIG. 1 illustrates a schematic diagram of water way connection of the sprinkler, according to an embodiment of this application.

The embodiments of this application provide an intelligent toilet, including a toilet body, a sprinkler 100, a movable device and a water storage device. The water storage device is installed in the toilet body. The movable device can be installed in the toilet body in a movable way and the sprinkler 100 is installed on the movable device. The movable device is used for adjusting the position of the sprinkler 100 on the toilet body, such as controlling the stretching, retracting, or rotating of the sprinkler 100. The water storage device is connected to the sprinkler 100 for providing water. It can be understood that the movable device includes a movable body, a motor, a telescopic rod, and a connector. The movable body can be installed on the toilet body in a movable way. The motor is installed on the movable body. The telescopic rod is installed on the movable body. The motor drives the telescopic rod to move. The connector is installed on the telescopic rod. The sprinkler 100 is installed on the connector. In some embodiments, the motor drives the connector to rotate or swing.

Figure 2:
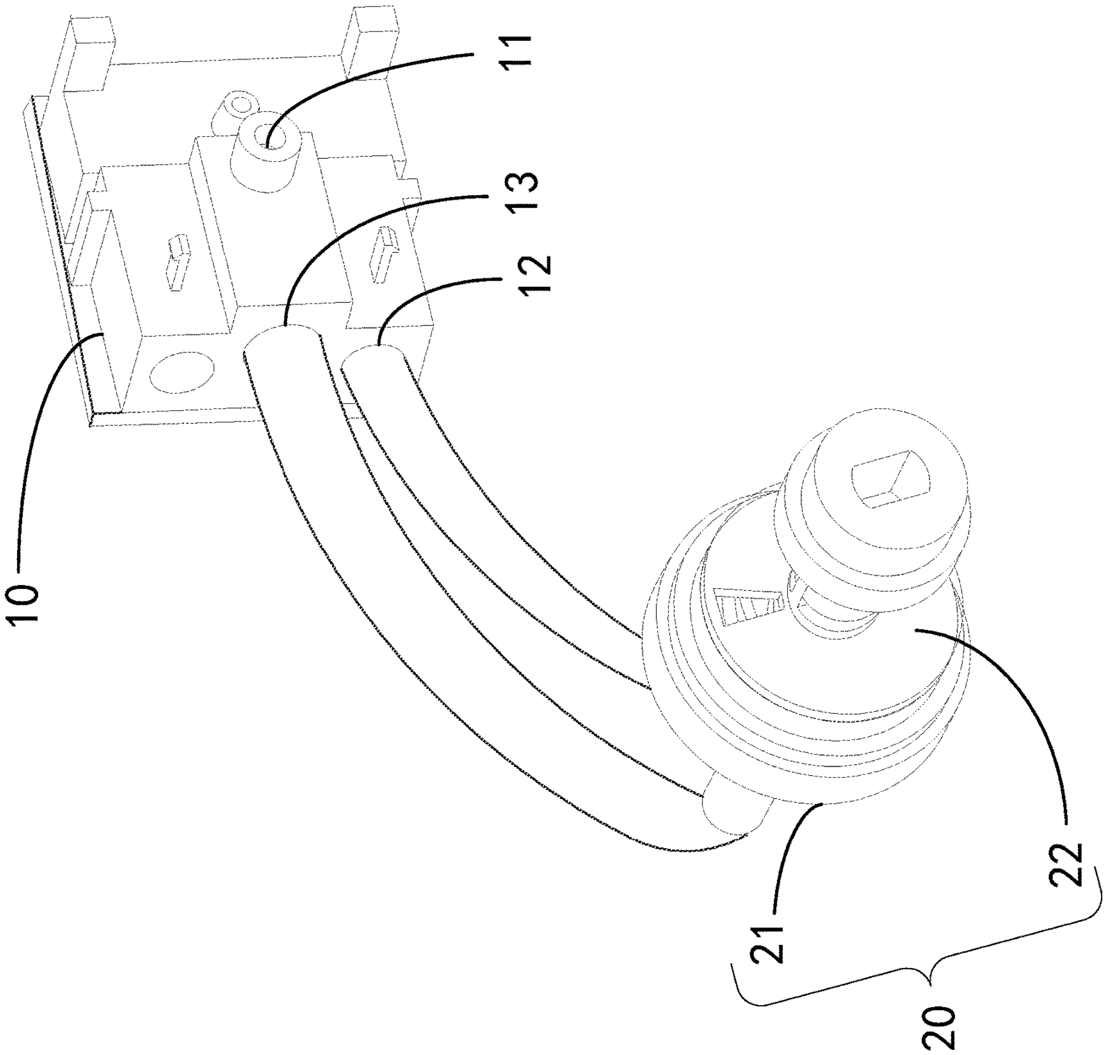
FIG. 2 illustrates a schematic diagram of the sprinkling mechanism and the adjusting mechanism, according to an embodiment of this application.

FIG. 2 illustrates a schematic diagram of the sprinkling mechanism and the adjusting mechanism, according to an embodiment of this application.

Referring to FIG. 2, an embodiment of this application provides a sprinkler 100 including a sprinkling mechanism 10, an adjusting mechanism 20, and a water supply mechanism 30. The sprinkling mechanism 10 includes a mixing chamber 11, a first water distribution chamber 12, and a second water distribution chamber 13. The first water distribution chamber 12 and the second water distribution chamber 13 are separately set and connected to the mixing chamber 11. The first water distribution chamber 12 is configured to sprinkle vortex water via mixing chamber 11. The first water distribution chamber 13 is configured to sprinkle straight water via mixing chamber 11. The adjusting mechanism 20 includes a water outlet seat 21 and an adjusting cap 22.

Figure 3:
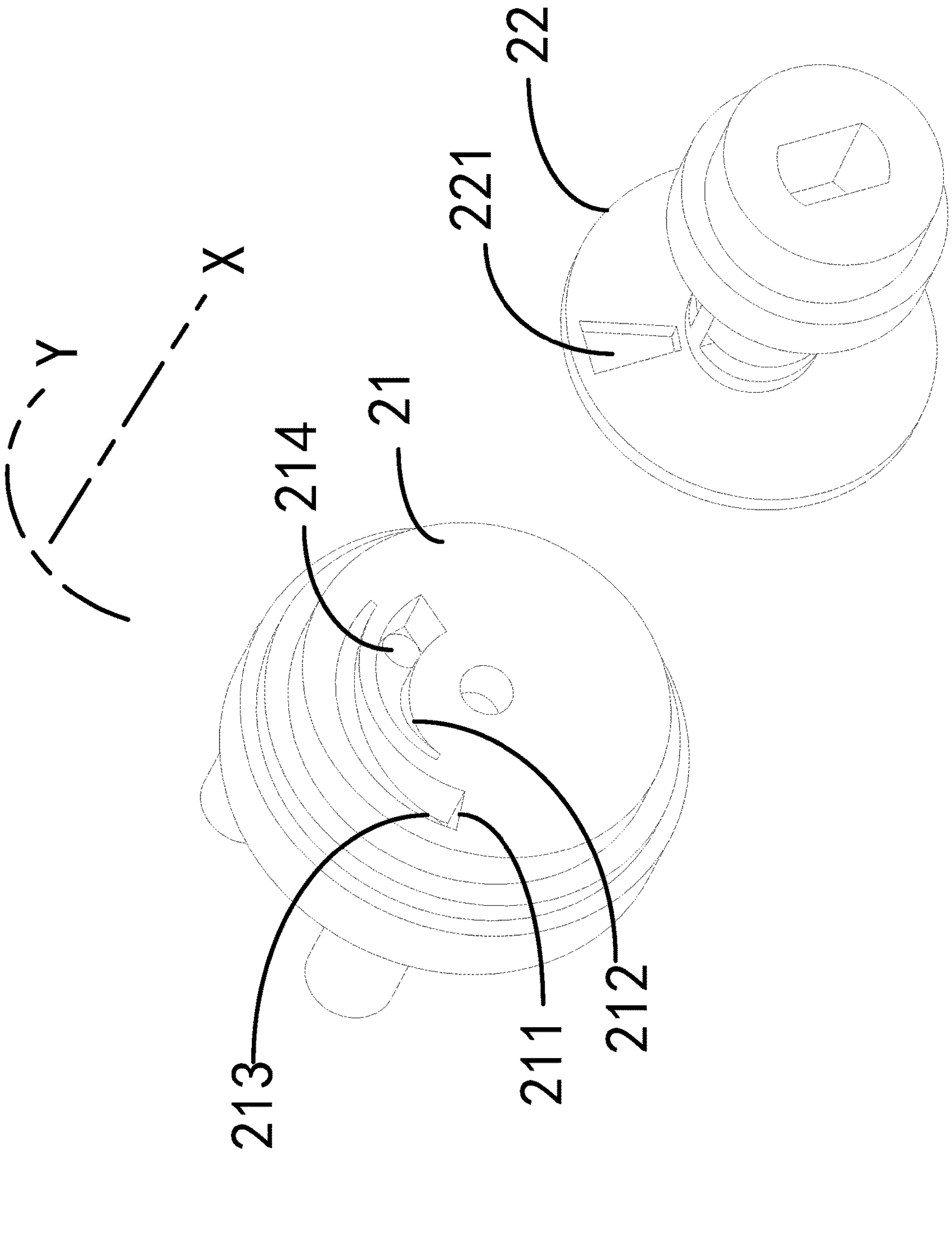
FIG. 3 illustrates a breakdown drawing of the adjusting mechanism, according to an embodiment of this application.

FIG. 3 illustrates a breakdown drawing of the adjusting mechanism, according to an embodiment of this application.

Referring to FIG. 3, the adjusting cap 22 with a water hole 221 can be placed on the water outlet seat 21 in a movable way and the water outlet seat 21 is set with a first water outlet trough 211 and a second water outlet trough 212. The first water outlet trough 211 is connected to the first water distribution chamber 12. The second water outlet trough 212 is connected to the second water distribution chamber 13. The water supply mechanism 30 is set on a side of the adjustment cap 22 away from the water outlet seat 21. The adjusting cap 22 and the water outlet seat 21 are in relative motion among the first preset position, the second preset position, and the third preset position. At the first preset position, the water supply mechanism 30 is connected to the first water outlet trough 211; at the second preset position, both a part of the first water outlet trough 211 and a part of the second water outlet trough 212 is connected to the water supply mechanism 30; at the third preset position, the water supply mechanism 30 is connected to the second water outlet trough 212.

Figure 8:
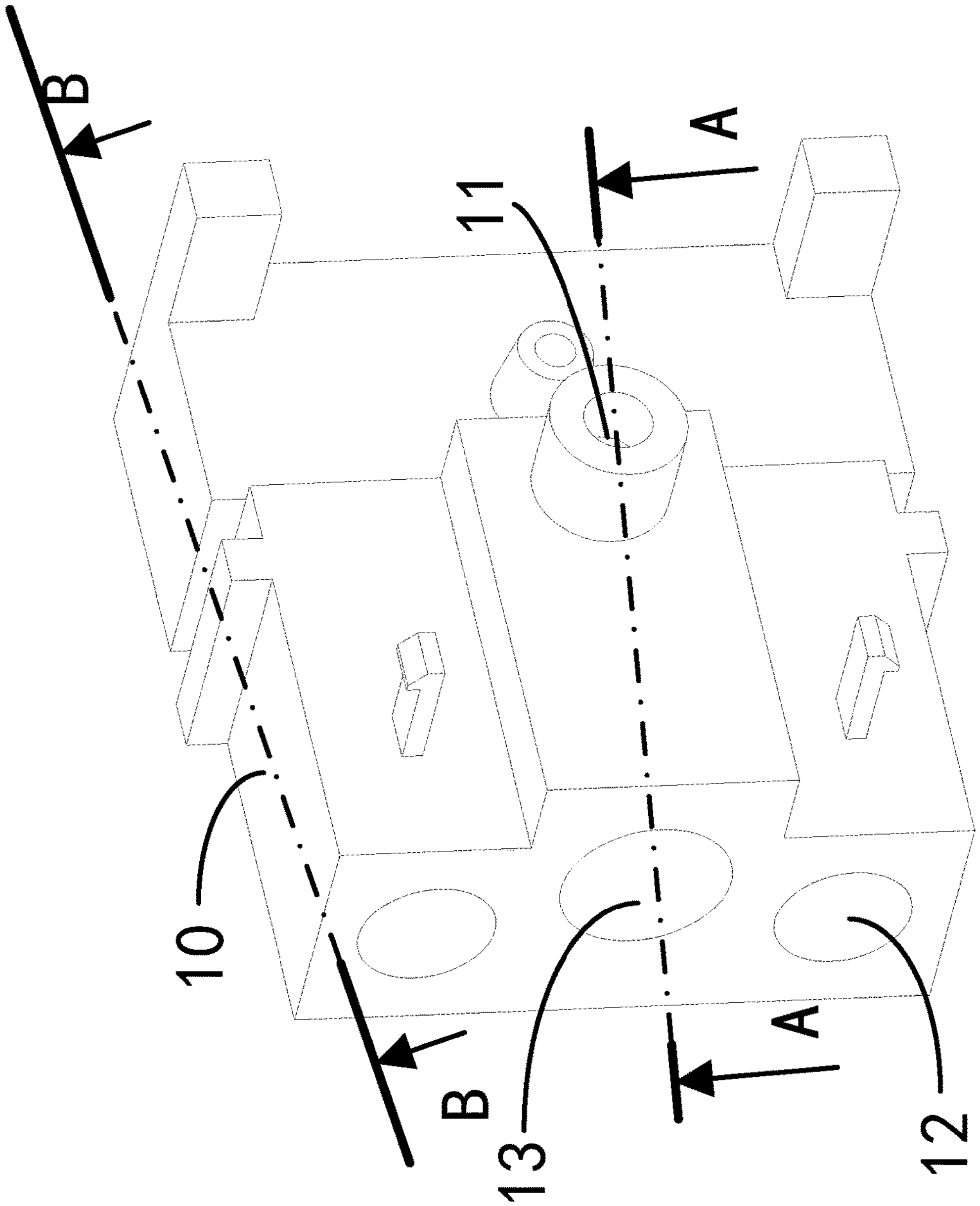
FIG. 8 illustrates a part drawing of the sprinkling mechanism, according to an embodiment of this application.
Figure 9:
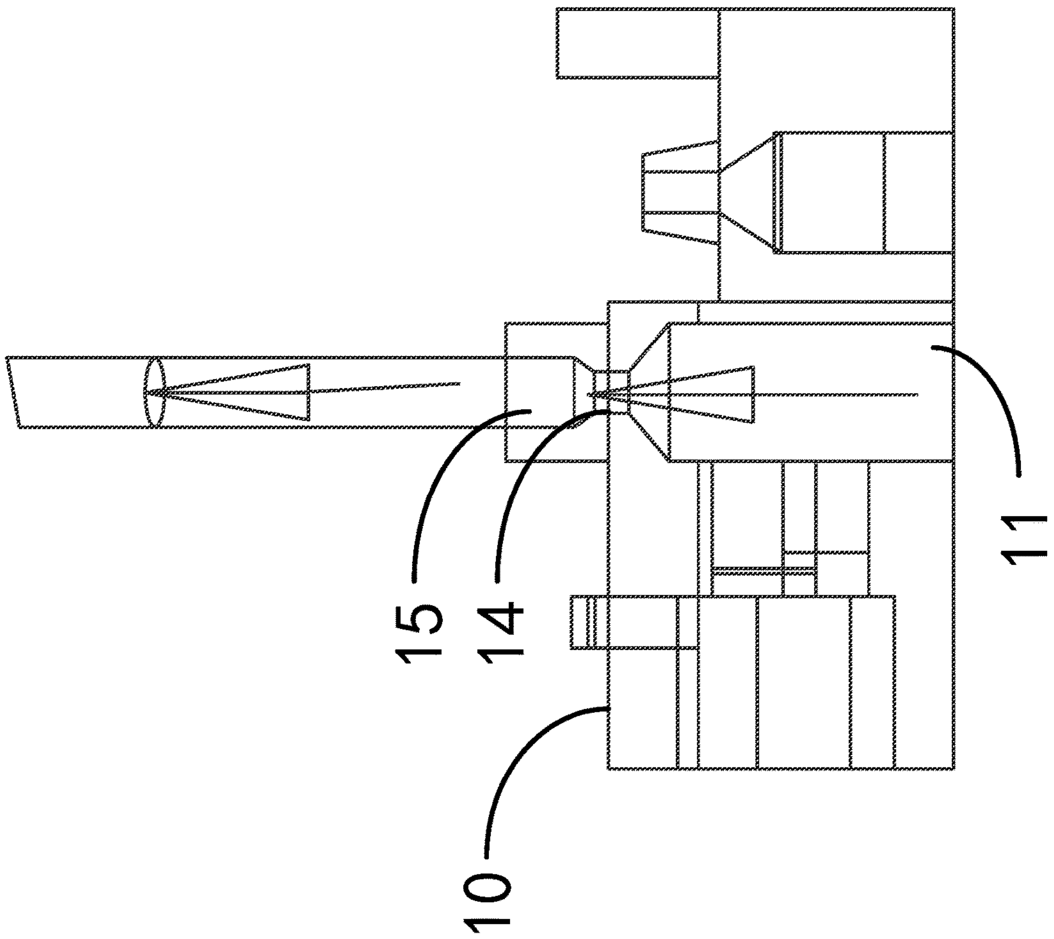
FIG. 9 illustrates a schematic diagram of the section of surface A of FIG. 8, according to an embodiment of this application.
Figure 10:
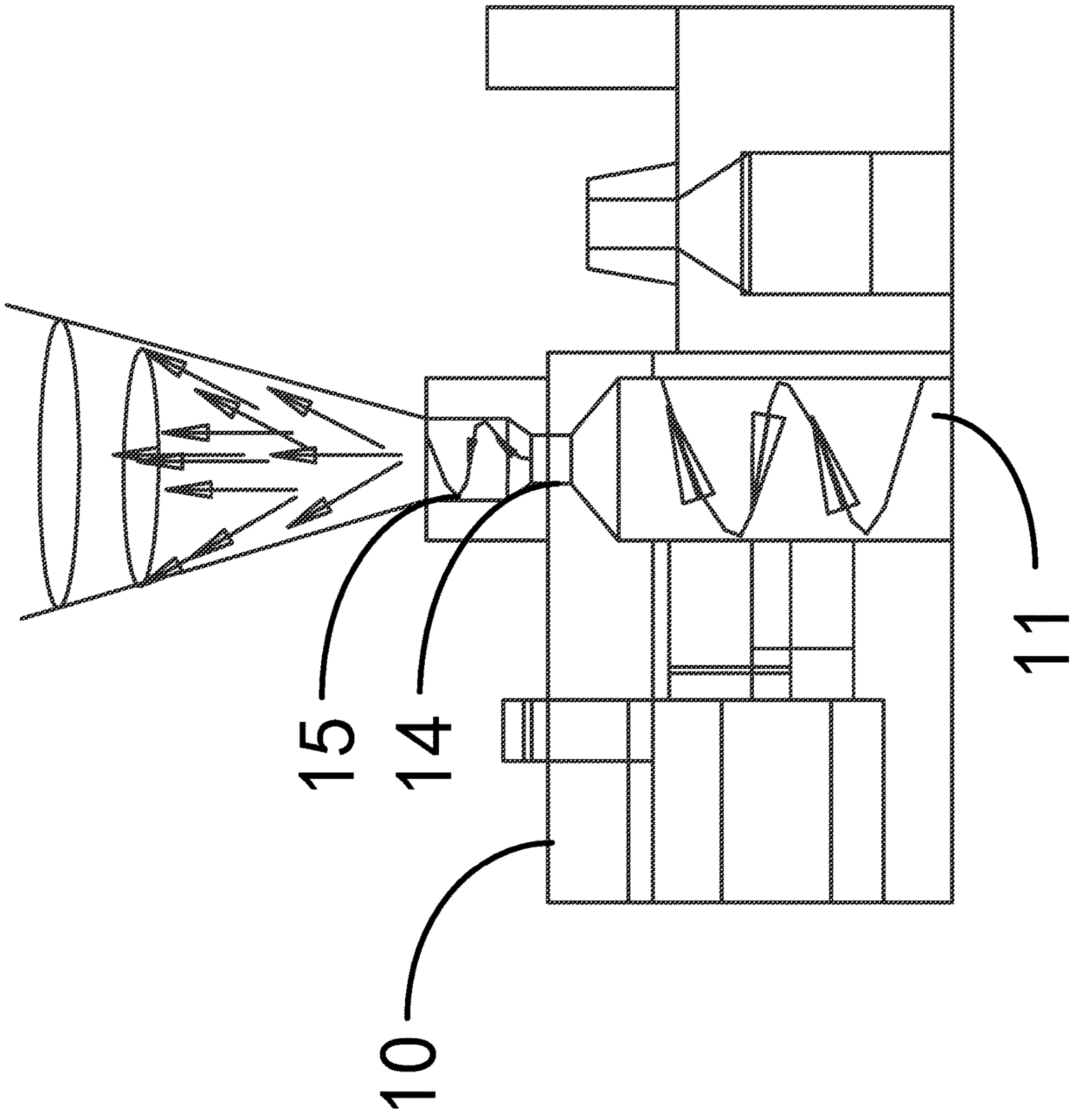
FIG. 10 illustrates a schematic diagram of the section of the other surface A of FIG. 8, according to an embodiment of this application.

FIG. 8 illustrates a part drawing of the sprinkling mechanism, according to an embodiment of this application. FIG. 9 illustrates a schematic diagram of the section of surface A of FIG. 8, according to an embodiment of this application. FIG. 10 illustrates a schematic diagram of the section of the other surface A of FIG. 8, according to an embodiment of this application.

Referring to FIGS. 8 to 10, the sprinkling mechanism 10 can sprinkle vortex water and/or straight water from the same mixing chamber 11 to meet different demands of users in different usage situations. It should be noted that the expression that "the sprinkling mechanism 10 can sprinkle vortex water and/or straight water" refers to that the adjusting cap 22 and the water outlet seat 21 are in relative motion among the first preset position, the second preset position, and the third preset position so that when the adjusting cap 22 and the water outlet seat 21 are at the second preset position, the mixing chamber 11 can sprinkle both the vortex water and the straight water. The second preset position may be any position between the first preset position and the third preset position, i.e. the flow rate of vortex water and the flow rate of straight water can be in any proportion to realize the effect of stepless regulation of water from the mixing chamber 11. It should be noted that the stepless regulation refers to regulating the proportion of water from the first water distribution chamber 12 and water from the second water distribution chamber 13 into the mixing chamber 11 to achieve the effect of adjusting water flow. It is worth mentioning that the difference between vortex water and straight water is that the widths of the sprinkled vortex water flow and sprinkled straight water flow are different. Vortex flow refers to the flow in a divergent state, while straight flow refers to the flow in a water beam state. It should also be noted that the water supply mechanism 30 is configured to cause water to flow through the water hole 221 on the adjusting cap 22 and then flow into the first water outlet trough 211 and/or the second water outlet trough 212 to divert the water flow. By controlling the relative motion of the adjusting cap 22 and the water outlet seat 21 at the first preset position, the second preset position and the third preset position to regulate the amount of water flow flowing into the first water outlet trough 211 and the second water outlet trough 212 so as to adjust the water flow flowing into the first water distribution chamber 12 and the second water distribution chamber 13. The water flow flows through the first water distribution chamber 12 and/or the second water distribution chamber 13, enters the mixing chamber 11, and then is sprinkled.

Figure 4:
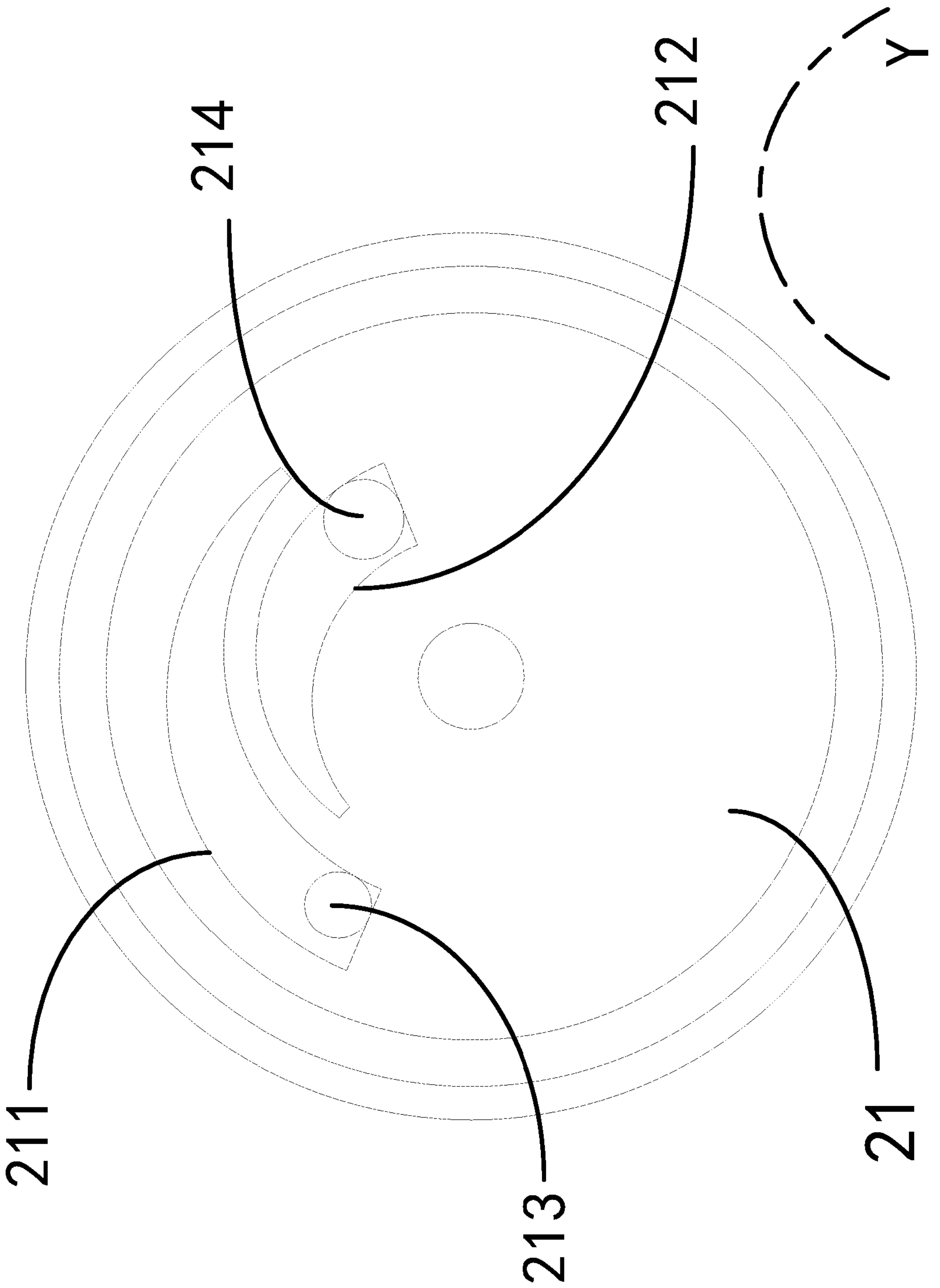
FIG. 4 illustrates a schematic diagram of the water outlet seat, according to an embodiment of this application.
Figure 5:
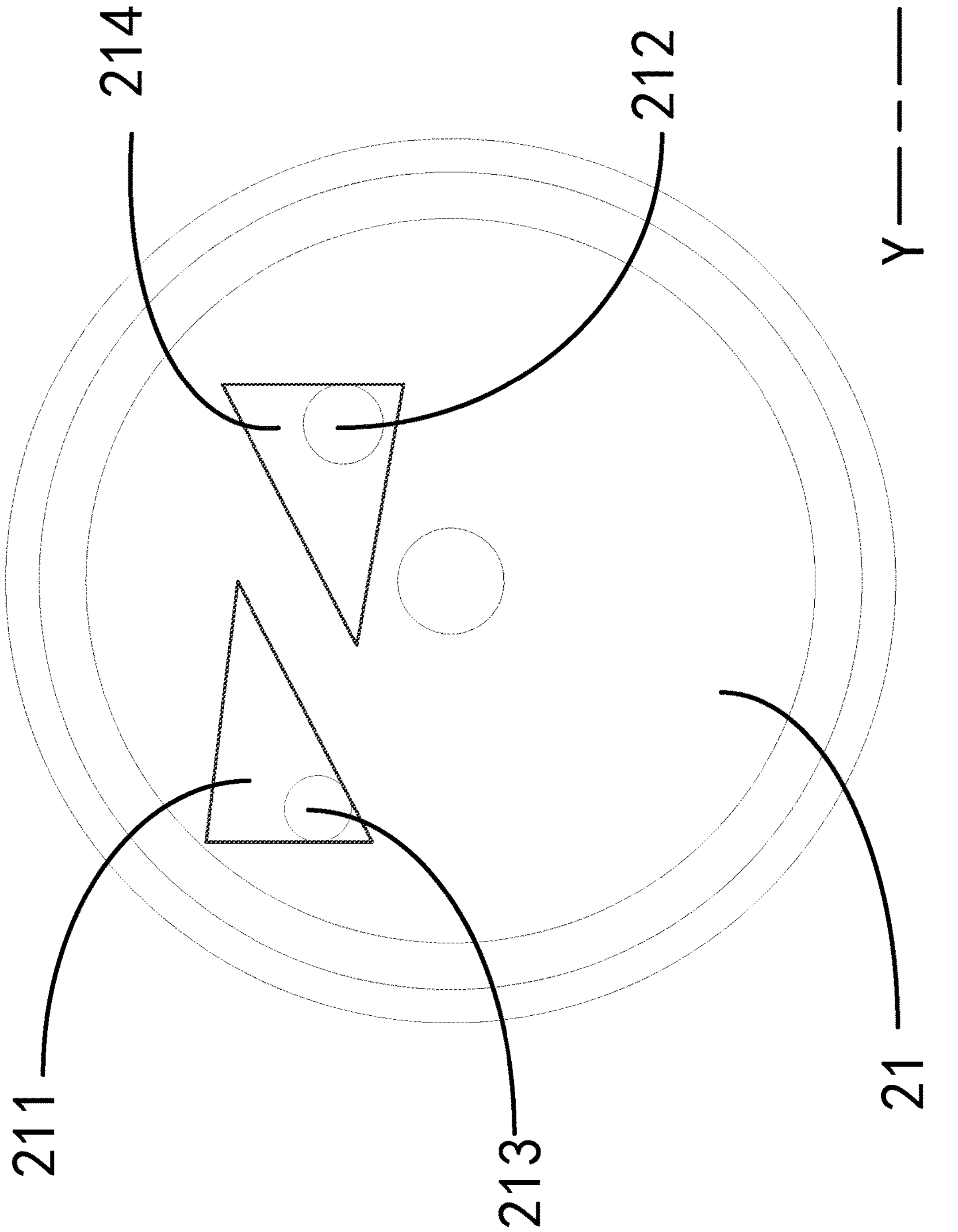
FIG. 5 illustrates a schematic diagram of the water outlet seat, according to another embodiment of this application.

FIG. 4 illustrates a schematic diagram of the water outlet seat, according to an embodiment of this application. FIG. 5 illustrates a schematic diagram of the water outlet seat, according to another embodiment of this application.

Furthermore, referring to FIGS. 2-5, along the first direction X, the area of the first water outlet trough 211 is M1, and the area of the first water outlet trough 211 along the second direction Y gradually reduces. The area of the second water outlet trough 212 is M2, and the area of the second water outlet trough 212 along the second direction Y gradually increases. The area of the water hole 221 is M3, and M3 is greater than or equal to M1+M2. The first direction X is perpendicular to the second direction Y. When the adjusting cap 22 and the water outlet seat 21 are at the first preset position, M3 is greater than or equal to M1, and M2 is 0, i.e. the first water outlet trough 211 is connected to the water supply mechanism 30 through the water hole 221; the water supply mechanism 30 is separated from the second water outlet trough 212; and the mixing chamber 11 sprinkles the vortex water. When the adjusting cap 22 and the water outlet seat 21 are at the third preset position, M3 is greater than or equal to M2, and M1 is 0, i.e. the second water outlet trough 212 is connected to the water supply mechanism 30 through the water hole 221; the water supply mechanism 30 is separated from the first water outlet trough 211; and the mixing chamber 11 sprinkles the straight water. When the adjusting cap 22 and the water outlet seat 21 are at the second preset position, M3 is greater than or equal to M1+M2, i.e. the part of the first water outlet trough 211 is connected to the water supply mechanism 30 through the water hole 221; and the part of the second water outlet trough 212 is connected to the water supply mechanism 30 through the water hole 221. The second preset position may be any position between the first preset position and the second preset position to make M1 and M2 in any proportion to regulate water flow.

In an embodiment of this application, referring to FIGS. 2-5, the water outlet seat 21 is cylindrical, and both the first water outlet trough 211 and the second water outlet trough 212 are set surrounding the center of a circle of the water outlet seat 21. The water outlet seat 21 includes a first water outlet 213. The first water outlet 213 is set at the bottom of the first water outlet trough 211 and is connected to the first water distribution chamber 12. A second water outlet 214 is set at the bottom of the second water outlet trough 212 and is connected to the second water distribution chamber 13. Specifically, the water outlet seat 21 includes many cylinders with different radii for connecting to other structures of the sprinkler 100 or connecting to other structures besides the sprinkler 100. The outer edge of the first water outlet trough 211 away from the center of the circle is of a circular arc shape and the inner edge is of a centrifuge arc shape to form the first water outlet trough 211 of which the area along the second direction Y gradually reduces. The outer edge of the second water outlet trough 212 away from the center of the circle is of a circular arc shape and the inner edge is of a centrifuge arc shape to form the second water outlet trough 212 of which the area along the second direction Y gradually increases. It should be noted that between the first preset position and the third preset position, the line connecting the center of the first water outlet trough 211 and the water outlet seat 21 passes through the second water outlet trough 212. In the embodiment, the first direction X is perpendicular to the surface of water outlet seat 21 and the second direction Y is circumferential around the first direction X.

In another embodiment of this application, referring to FIG. 5, the water outlet seat 21 is cylindrical. The first water outlet trough 211 and the second water outlet trough 212 are set in parallel. Along the first direction X, the first water outlet trough 211 is triangular, and the second direction Y is perpendicular to one side of the triangle. Correspondingly, the second water outlet trough 212 is also triangular. It should be noted that between the first preset position and the third preset position, the line connecting the center of the first water outlet trough 211 and the water outlet seat 21 passes through the second water outlet trough 212. In some embodiments, along the first direction X, both the first water outlet trough 211 and the second water outlet trough 212 are trapezoidal or in other irregular shapes, the area of the first water outlet trough 211 along the second direction Y gradually reduces and the area of the second water outlet trough 212 gradually increases. The specific structural design is consistent with the above embodiment and will not be elaborated here. In the embodiment, the first direction X is perpendicular to the surface of water outlet seat 21 and the second direction Y is perpendicular to the first direction X.

Furthermore, referring to FIG. 2 in combination with other drawings, the first water outlet trough 211 gradually reduces in depth and the first water outlet 213 is set at the bottom of the first water outlet trough 211 with the maximum depth. The second water outlet trough 212 gradually increases in depth and the second water outlet 214 is set at the bottom of the second water outlet trough 212 with the maximum depth so as to further adjust the flow rate of water in the first water outlet trough 211 and/or in the second water outlet trough 212.

Figure 6:
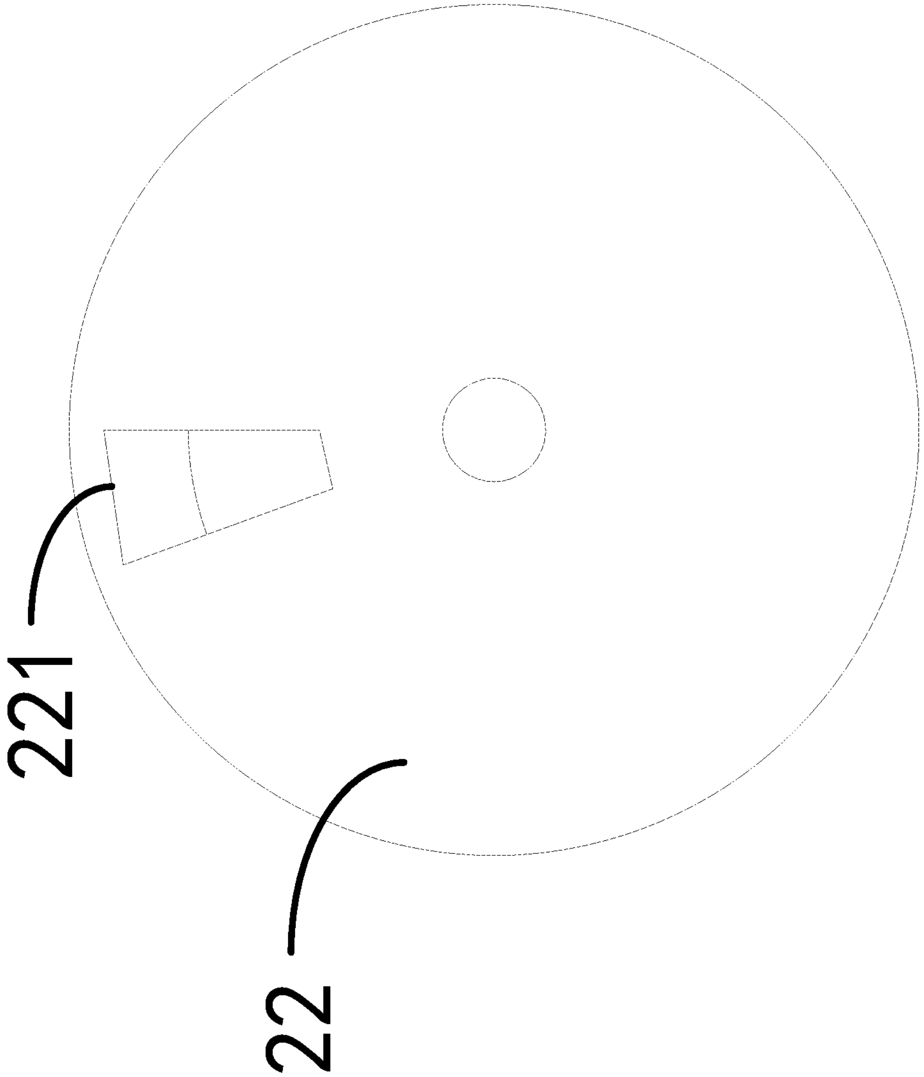
FIG. 6 illustrates a schematic diagram of the adjusting cap, according to an embodiment of this application.
Figure 7:
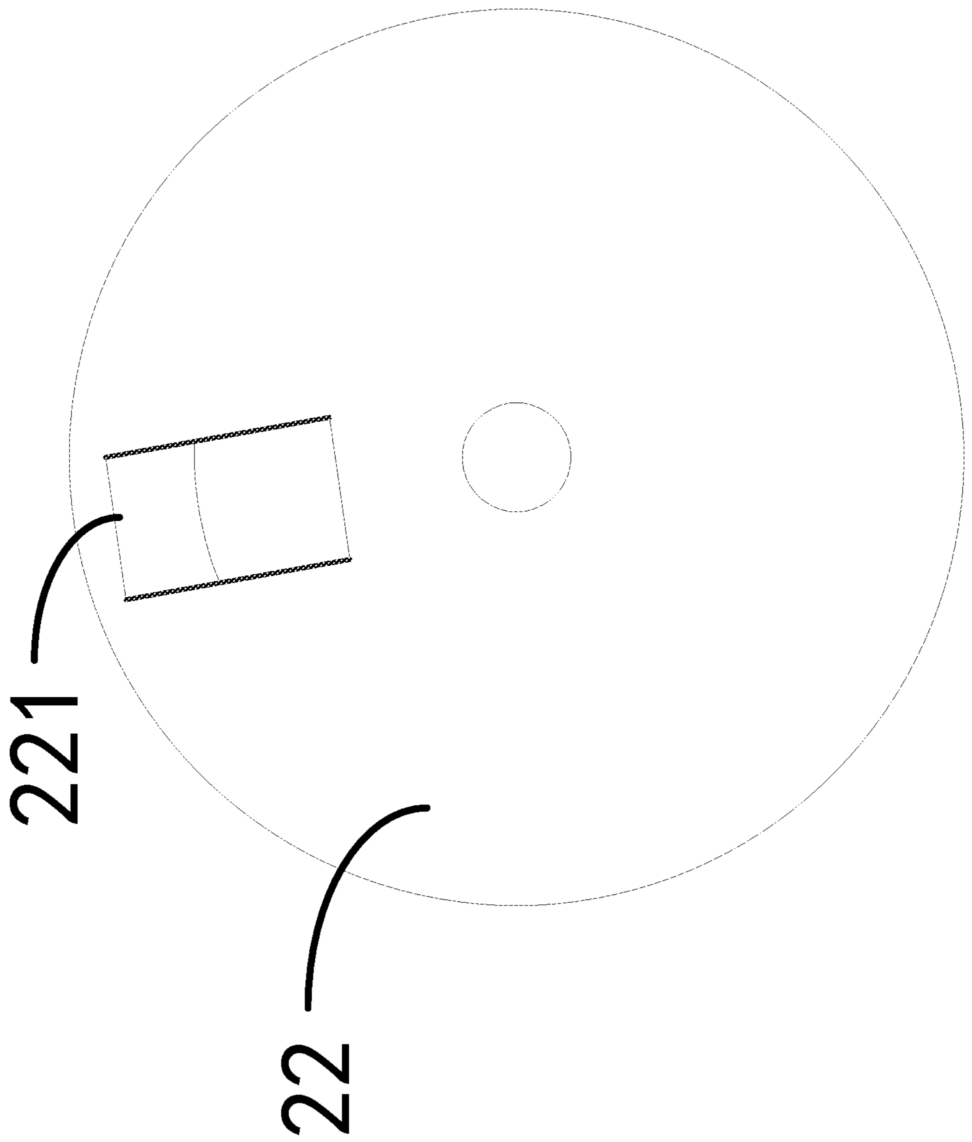
FIG. 7 illustrates a schematic diagram of the adjusting cap, according to another embodiment of this application.

FIG. 6 illustrates a schematic diagram of the adjusting cap, according to an embodiment of this application. FIG. 7 illustrates a schematic diagram of the adjusting cap, according to another embodiment of this application.

As for the adjusting cap 22, referring to FIGS. 6-7, along the first direction X, the adjusting cap 22 is pie-shaped. The water hole 221 extends radially along the adjusting cap 22, and the width of an end of the water hole 221 away from the center of a circle of the adjusting cap 22 is larger than or equal to the width of an end of the water hole 221 close to the center of a circle of the adjusting cap 22. In an embodiment of this application, the water hole 221 is a through-hole in the shape of an isosceles trapezoid, while in other embodiments, the water hole 221 may be triangle, rectangle and other shaped holes or isosceles holes.

Figure 11:
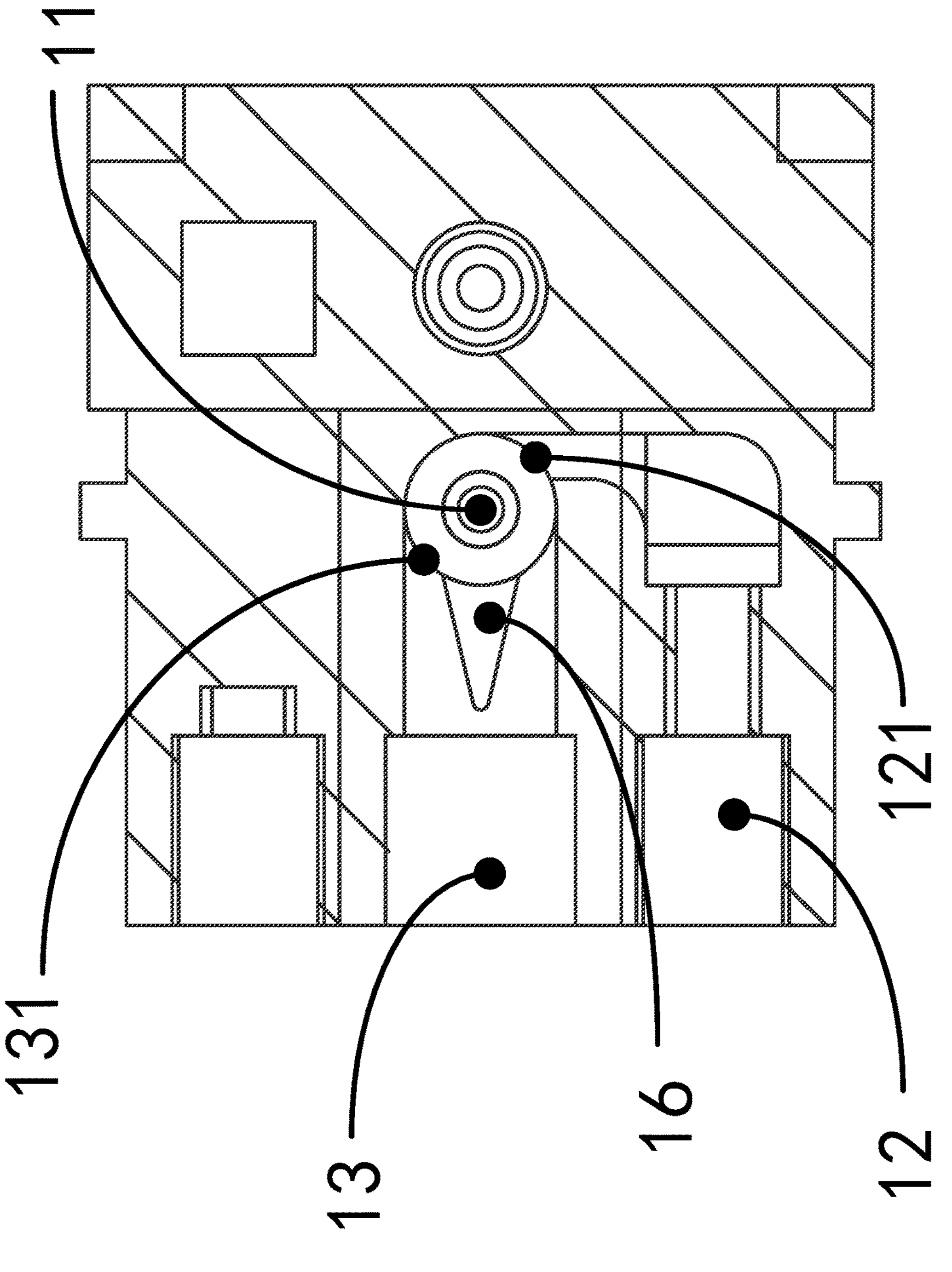
FIG. 11 illustrates a schematic diagram of the section of surface B of FIG. 8, according to an embodiment of this application.

FIG. 11 illustrates a schematic diagram of the section of surface B of FIG. 8, according to an embodiment of this application.

For the sprinkling mechanism 10, please refer to FIGS. 9-11, the mixing chamber 11 body is cylindrical. The first water distribution chamber 12 is connected to the mixing chamber 11, with the first water distribution port 121 at the connection. The second water distribution chamber 13 is connected to the mixing chamber 11, with the second water distribution port 131 at the connection. At least one of the first water distribution port 121 or the second water distribution port 131 extends tangentially to the mixing chamber 11 body, and the directions of the first water distribution port 121 and the second water distribution port 131 are not collinear. In some embodiments, both the first water distribution port 121 and the second water distribution port 131 extend along the tangential direction of the mixing chamber 11 body; or, one of the first water distribution port 121 or the second water distribution port 131 extends along the tangential direction of the mixing chamber 11 and the other one extends along the radial direction of the mixing chamber 11. Alternatively, one of the first water distribution port 121 or the second water distribution port 131 extends along the tangential direction and the other extends along the axial direction of the mixing chamber 11 body.

Specifically, referring to FIG. 11, the first water distribution port 121 is connected to the mixing chamber 11 and the first water distribution chamber 12 along the tangent of the mixing chamber 11. The second water distribution chamber 13 is set with two second water distribution ports 131 which are connected to the mixing chamber 11 and the second water distribution port 131 along the tangent direction of relative two ends of the mixing chamber along the radial direction. It should be noted that the sprinkling mechanism 10 is also set with a water distribution part 16. The water distribution part 16 is set in the middle position of the second water distribution chamber 13. The water distribution part 16 divides the second water distribution chamber 13 into two second water distribution ports 131 to ensure flow rates of the two water distribution ports are the same. It can be understood that the relative two ends of the mixing chamber 11 along the radial direction refer to symmetric setting of two second water distribution ports 131 with the radial direction of the mixing chamber 11 as the axis of symmetry. It can be understood that the axis of symmetry passes through the water distribution part 16.

Furthermore, referring to FIG. 11, the diameter of the first water distribution port 121 is smaller than that of the first water distribution chamber 12 and the diameter of the second water distribution port 131 is smaller than that of the second water distribution chamber 13 so as to increase the flow velocity by pressure boosting.

As for the mixing chamber 11, referring to FIGS. 9-10, the mixing chamber 11 is provided with the third water outlet 14 and the fourth water outlet 15. The diameter of the third water outlet 14 is smaller than that of the mixing chamber 11 and the diameter of the fourth water outlet 15 is larger than that of the third water outlet 14. It can be understood that when the mixing chamber 11 outputs the straight water, the third water outlet 14 decreases the diameter to pressurize to increase the flow velocity of the straight water. When the mixing chamber 11 outputs vortex water, because the vortex water is in a divergence state, the vortex water contacts the surface of the fourth water outlet 15 after passing through the third water outlet 14 and is continuously sprayed. Besides, the flow velocity of the vortex water can be increased after being pressurized by the third water outlet 14.

The embodiments of this application provide a sprinkler 100 which includes a sprinkling mechanism 10, an adjusting mechanism 20 and a water supply mechanism 30. The sprinkling mechanism 10 includes a mixing chamber 11, a first water distribution chamber 12 and a second water distribution chamber 13 where the first water distribution chamber 12 and the second water distribution chamber 13 are connected to the mixing chamber 11 for sprinkling the vortex water and the straight water respectively from the mixing chamber 11. The adjusting mechanism 20 includes a water outlet seat 21 and an adjusting cap 22 where the adjusting cap 22 with a water hole 221 can be placed on the water outlet seat 21 in a movable way and the water outlet seat 21 is set with a first water outlet trough 211 and a second water outlet trough 212 for connecting to the first water distribution chamber 12 and the second water distribution chamber 13 respectively. The water supply mechanism 30 is set on the adjustment cap 22 on the side away from the water outlet seat 21. The adjusting cap 22 and the water outlet seat 21 are in relative motion among the first preset position, the second preset position, and the third preset position. At the first preset position, the water supply mechanism 30 is connected to the first water outlet trough 211; at the second preset position, both the part of the first water outlet trough 211 and the part of the second water outlet trough 212 are connected to the water supply mechanism 30; at the third preset position, the water supply mechanism 30 is connected to the second water outlet trough 212. The above structure ensures the connection between the first water outlet trough 211 and the first water distribution chamber 12 and/or connection between the second water outlet trough 212 and the second water distribution chamber 13 during relative motion of the adjusting cap 22 and the water outlet seat 21 among the first preset position, the second preset position and the third preset position so as to realize the stepless regulation between vortex flow and straight flow from the mixing chamber 11 without the need of circuit break and water sprinkling again, providing convenience.

Based on the same conception, the embodiments of this application provide an intelligent toilet which includes the sprinkler 100. The sprinkler 100 is the same as above sprinkler 100 in structures and functions. Thus, it would be redundant to repeat here. Therefore, the intelligent toilet also can improve the current situation where the structure of the water outlet causes a relatively long time gap when switching the water pattern, resulting in a poor user experience.

It should be noted that the specifications and the drawings in the application show the better embodiments. However, the application can be realized in different forms and is not limited to the embodiments mentioned in the specifications. These embodiments are not intended as additional limitations on the content of this application, but are provided to make the understanding of content in the application more thorough and comprehensive. Furthermore, the above technical features continue to be combined with each other to form various embodiments not listed above which are considered within the scope of the specifications of this application. Furthermore, the ordinary person skilled in the art may improve or change based on above specifications. All improvements and changes shall be within the protection scope of claims in the application.

What is claimed is:

1. A sprinkler, comprising:
- a mixing chamber;
- a first water distribution chamber connected to the mixing chamber;
- a second water distribution chamber connected to the mixing chamber;
- a water outlet seat comprising a first water outlet trough connected to the first water distribution chamber and a second water outlet trough connected to the second water distribution chamber; and
- an adjusting cap placed on the water outlet seat on a first side of the adjusting cap,
- wherein water is configured to be supplied to the adjusting cap from a second side of the adjusting cap away from the first side,
- wherein the adjusting cap and the water outlet seat are configured for relative motion among:
  - a first preset position, at which water is configured to be supplied to the first water outlet trough;
  - a second preset position, at which water is configured to be supplied to both a portion of the first water outlet trough and a portion of the second water outlet trough; and
  - a third preset position, at which water is configured to be supplied to the second water outlet trough.

2. The sprinkler according to claim 1, wherein, along a first direction, an area of the first water outlet trough is M1, and the area of the first water outlet trough along a second direction gradually reduces;
- wherein an area of the second water outlet trough is M2, and the area of the second water outlet trough along the second direction gradually increases;
- wherein the adjusting cap comprises a water hole with an area of M3, and M3 is greater than or equal to the combination of M1 and M2; and
- wherein the first direction is perpendicular to the second direction.

3. The sprinkler according to claim 2, wherein the water outlet seat is cylindrical, both the first water outlet trough and the second water outlet trough are provided at least partially surrounding a center of a circle of the water outlet seat, and the water outlet seat comprises:
- a first water outlet, set at a bottom of the first water outlet trough and connected to the first water distribution chamber; and
- a second water outlet, set at a bottom of the second water outlet trough and connected to the second water distribution chamber.

4. The sprinkler according to claim 3, wherein, along the second direction, the first water outlet trough gradually reduces in depth, and the first water outlet is set at the bottom of the first water outlet trough with a maximum depth; and
- wherein the second water outlet trough gradually increases in depth, and the second water outlet is set at the bottom of the second water outlet trough with a maximum depth.

5. The sprinkler according to claim 3, wherein the adjusting cap is disk-shaped, and
- wherein, when viewed from the first direction, the water hole extends radially along the adjusting cap, and a width of a first end of the water hole away from a center of a circle of the adjusting cap is larger than or equal to a width of a second end of the water hole close to the center of the circle of the adjusting cap.

6. The sprinkler according to claim 1, wherein a body of the mixing chamber is cylindrical, wherein a first water distribution port is configured to connect the first water distribution chamber with the mixing chamber, and a second water distribution port is configured to connect the second water distribution chamber with the mixing chamber, and wherein at least one of the first or the second water distribution ports extends tangentially to the body of the mixing chamber, and a direction of the first water distribution port and a direction of the second water distribution port are not collinear.

7. The sprinkler according to claim 6, wherein the first water distribution port connects the mixing chamber with the first water distribution chamber along a tangent of the mixing chamber, and wherein the second water distribution chamber comprises two second water distribution ports that respectively connect the mixing chamber with the second water distribution chamber along tangents of two opposing ends of a diameter of the mixing chamber.

8. The sprinkler according to claim 6, wherein a diameter of the first water distribution port is smaller than a diameter of the first water distribution chamber, and a diameter of the second water distribution port is smaller than a diameter of the second water distribution chamber.

9. The sprinkler according to claim 6, wherein the mixing chamber comprises:

a third water outlet, wherein a diameter of the third water outlet is smaller than a diameter of the mixing chamber; and a fourth water outlet, wherein a diameter of the fourth water outlet is larger than the diameter of the third water outlet.

10. An intelligent toilet comprising a sprinkler, wherein the sprinkler comprises:

a mixing chamber;

a first water distribution chamber connected to the mixing chamber;

a second water distribution chamber connected to the mixing chamber;

a water outlet seat comprising a first water outlet trough connected to the first water distribution chamber and a second water outlet trough connected to the second water distribution chamber; and an adjusting cap placed on the water outlet seat on a first side of the adjusting cap, wherein water is configured to be supplied to the adjusting cap from a second side of the adjusting cap away from the first side, wherein the adjusting cap and the water outlet seat are configured for relative motion among:

a first preset position, at which water is configured to be supplied to the first water outlet trough;

a second preset position, at which water is configured to be supplied to both a portion of the first water outlet trough and a portion of the second water outlet trough; and a third preset position, at which water is configured to be supplied to the second water outlet trough.

* * * * *